W. W. Gilbert.
Steam Engine Govenor.
Nº 85,580. Patented Jan. 5, 1869.
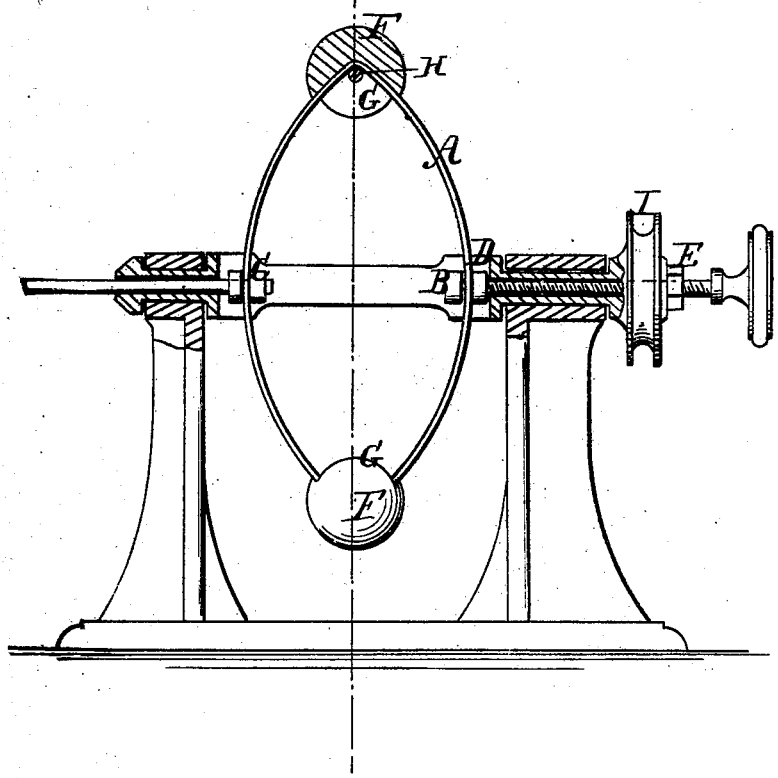
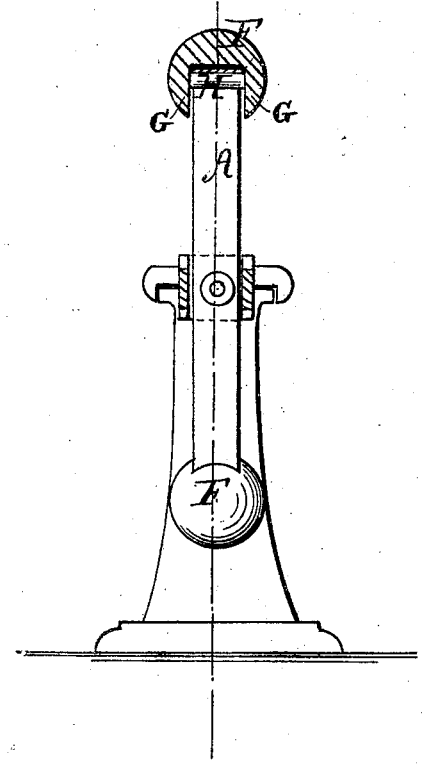

W. W. GILBERT, OF NEW YORK, N. Y.

Letters Patent No. 85,580, dated January 5, 1869.

IMPROVEMENT IN STEAM-ENGINE GOVERNORS.

The Schedule referred to in these Letters Patent and making part of the same.

*To all whom it may concern:*

Be it known that I, W. W. GILBERT, of the city, county, and State of New York, have invented a new and improved Governor for Steam-Engines; and I do hereby declare that the following is a full, clear, and exact description thereof, which will enable those skilled in the art to make and use the same, reference being had to the accompanying drawings, forming part of this specification.

This invention relates to improvements in governors for steam-engines, and has for its object to provide a more simple and efficient governor than any now in use.

It consists in the arrangement of an elliptical spring, having weights connected to it at the ends of its longest diameter, and suspended upon rotary journals at its transverse axis, one of which journals is capable of an endwise motion, and is the means of governing the position of the valve.

Figure 1 represents an elevation of my improved governor partly in section, and

Figure 2 represents an end view, partly in section and partly in elevation.

Similar letters of reference indicate corresponding parts.

A represents an endless elliptical spring, suspended at its transverse axis upon the ends of the rods B and C, which project through the hollow journals of the rotary frame D, supported in suitable bearings, either in a horizontal or vertical position.

The rod C is made capable of sliding in the journal through which it passes, and is designed to be connected, in any suitable manner, to the stem of the governing valve.

The rod B is screwed through its bearing of the frame D, and is provided with a jam-nut, E, to hold it in any position to which it may be adjusted.

The weights F are provided with recesses G, of a form suitable to take the ends of the spring into them to about their centres, and to allow them to expand and contract, and they are secured to the same by pins H, passing through the balls and inside the rim of the spring.

The apparatus is set in motion by a belt from any suitable source, running over the pulley I on the frame D.

When the centrifugal action of the balls becomes sufficient to overcome the normal condition of the spring, they will tend to elongate it in the direction of its longest axis, and thereby shorten its transverse axis, and consequently move the rod C in one direction; and when the motion so slackens as to lessen the centrifugal action of the balls, the tension of the spring will tend to restore it to its normal condition, and consequently move the rod in the other direction.

By means of the adjustable arrangement of the rod B, the valve may be set to any length of opening required, for the engine to perform light or heavy work; and the improved method of securing the balls to the spring materially cheapens the cost of the construction of the same.

The arrangement of the balls at the extremity of the major axis, and the connection of the valve-stem to the spring at its minor axis, on which the spring is also suspended for rotation, afford a far more sensitive and effective apparatus than when this arrangement is reversed, for, with springs of the same size, the balls are caused to travel around a greater circle, and are therefore more powerfully affected by centrifugal force; but a more especial advantage is, that a slight elongation of the spring at its major axis produces a much greater movement at its minor axis, thereby giving to the valve a wide range of movement with a slight movement of the balls.

The spring may be suspended within the frame, as represented in the drawing, or upon an axle, as preferred.

In the latter case, sleeves enveloping the axle may take the place of the rods B and C.

I claim as new, and desire to secure by Letters Patent—

1. The elliptical-spring governor, constructed with the connection of the spring to the valve-stem at its minor axis, and the balls connected to the major axis of the spring, substantially as set forth.

2. The arrangement, with the spring and the rods B C, (one of which is adjustable,) of the rotating frame D, substantially as herein shown and described.

The above specification of my invention signed by me, this 2d day of September, 1868.

W. W. GILBERT.

Witnesses:
FRANK BLOCKLEY,
ALEX. F. ROBERTS.